US009148200B1

(12) United States Patent
Tsui et al.

(10) Patent No.: US 9,148,200 B1
(45) Date of Patent: *Sep. 29, 2015

(54) DETERMINING POWER OVER ETHERNET IMPAIRMENT

(71) Applicant: Marvell International Ltd., Hamilton (BM)

(72) Inventors: Tak-Lap Tsui, Sunnyvale, CA (US); Runsheng He, Sunnyvale, CA (US); Ozdal Barkan, Mountain View, CA (US); Dance Wu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,981

(22) Filed: Nov. 18, 2013

Related U.S. Application Data

(63) Continuation of application No. 12/323,292, filed on Nov. 25, 2008, now Pat. No. 8,588,705.

(60) Provisional application No. 61/007,240, filed on Dec. 11, 2007.

(51) Int. Cl.
*H04B 3/20* (2006.01)
*H04B 3/46* (2015.01)
*H04B 3/23* (2006.01)

(52) U.S. Cl.
CPC ............... *H04B 3/468* (2013.01); *H04B 3/237* (2013.01)

(58) Field of Classification Search
USPC .............. 379/406.08, 406.01, 3, 390.02, 392; 370/242, 248, 290, 201, 276, 287, 286; 375/224; 455/69
See application file for complete search history.

(56) References Cited

U.S. PATENT DOCUMENTS

| 4,337,463 | A | | 6/1982 | Vangen | |
|---|---|---|---|---|---|
| 4,366,350 | A | * | 12/1982 | Lee et al. | 379/29.07 |
| 4,385,384 | A | * | 5/1983 | Rosbury et al. | 714/717 |
| 4,805,215 | A | | 2/1989 | Miller | |
| 5,347,234 | A | | 9/1994 | Gersbach et al. | |
| 5,634,207 | A | | 5/1997 | Yamaji et al. | |
| 5,673,291 | A | | 9/1997 | Dent | |
| 5,708,656 | A | | 1/1998 | Noneman et al. | |
| 5,847,616 | A | | 12/1998 | Ng et al. | |
| 5,995,819 | A | | 11/1999 | Yamaji et al. | |

(Continued)

FOREIGN PATENT DOCUMENTS

| CN | 102067689 | 5/2011 |
|---|---|---|
| EP | 1860827 | 11/2007 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; *3GPP Organizational Partners*, (2012),302 pages.

(Continued)

*Primary Examiner* — Phuongchau Ba Nguyen

(57) ABSTRACT

A system and method of determining an unbalanced current condition in Power over Ethernet applications are disclosed. In some implementations, a user or network administrator may be notified of potential impairments due to unbalanced current.

20 Claims, 3 Drawing Sheets

(56) References Cited

U.S. PATENT DOCUMENTS

| | | | |
|---|---|---|---|
| 6,035,210 A | 3/2000 | Endo et al. | |
| 6,167,245 A | 12/2000 | Welland et al. | |
| 6,285,262 B1 | 9/2001 | Kuriyama | |
| 6,320,919 B1 | 11/2001 | Khayrallah et al. | |
| 6,347,091 B1 | 2/2002 | Wallentin et al. | |
| 6,366,622 B1 | 4/2002 | Brown et al. | |
| 6,374,117 B1 | 4/2002 | Denkert et al. | |
| 6,438,364 B1 | 8/2002 | Waite | |
| 6,452,458 B1 | 9/2002 | Tanimoto | |
| 6,509,777 B2 | 1/2003 | Razavi et al. | |
| 6,519,461 B1 | 2/2003 | Andersson et al. | |
| 6,535,037 B2 | 3/2003 | Maligeorgos | |
| 6,553,229 B1 | 4/2003 | Dent | |
| 6,640,308 B1 | 10/2003 | Keyghobad et al. | |
| 6,650,195 B1 | 11/2003 | Brunn et al. | |
| 6,675,328 B1 * | 1/2004 | Krishnamachari et al. | 714/704 |
| 6,738,358 B2 * | 5/2004 | Bist et al. | 370/289 |
| 6,741,846 B1 | 5/2004 | Welland et al. | |
| 6,741,862 B2 | 5/2004 | Chung et al. | |
| 6,754,189 B1 | 6/2004 | Cloutier et al. | |
| 6,816,452 B1 | 11/2004 | Maehata | |
| 6,816,718 B2 | 11/2004 | Yan et al. | |
| 6,922,433 B2 | 7/2005 | Tamura | |
| 6,934,566 B2 | 8/2005 | Kang et al. | |
| 6,946,950 B1 | 9/2005 | Ueno et al. | |
| 6,954,708 B2 | 10/2005 | Rakshani et al. | |
| 7,079,811 B2 | 7/2006 | Lee et al. | |
| 7,092,428 B2 | 8/2006 | Chen et al. | |
| 7,139,540 B2 | 11/2006 | Wu et al. | |
| 7,173,431 B1 | 2/2007 | Lo et al. | |
| 7,174,488 B1 * | 2/2007 | Chu | 714/712 |
| 7,206,840 B2 | 4/2007 | Choi et al. | |
| 7,212,798 B1 | 5/2007 | Adams et al. | |
| 7,239,882 B1 | 7/2007 | Cook | |
| 7,257,095 B2 | 8/2007 | Liu | |
| 7,286,009 B2 | 10/2007 | Andersen et al. | |
| 7,298,183 B2 | 11/2007 | Mirzaei et al. | |
| 7,310,023 B2 | 12/2007 | Cha et al. | |
| 7,319,849 B2 | 1/2008 | Womac | |
| 7,342,895 B2 | 3/2008 | Serpa et al. | |
| 7,355,416 B1 | 4/2008 | Darshan | |
| 7,377,441 B2 | 5/2008 | Wiklof et al. | |
| 7,395,040 B2 | 7/2008 | Behzad | |
| 7,403,018 B1 | 7/2008 | Lo et al. | |
| 7,463,592 B2 | 12/2008 | Poncini et al. | |
| 7,529,548 B2 | 5/2009 | Sebastian | |
| 7,564,826 B2 | 7/2009 | Sherman et al. | |
| 7,595,768 B2 | 9/2009 | Li et al. | |
| 7,599,671 B2 | 10/2009 | Kopikare et al. | |
| 7,616,935 B2 | 11/2009 | Fernandez-Corbaton et al. | |
| 7,626,966 B1 | 12/2009 | Ruiter et al. | |
| 7,627,025 B2 * | 12/2009 | Wang et al. | 375/224 |
| 7,627,026 B2 * | 12/2009 | Wang et al. | 375/224 |
| 7,636,388 B2 * | 12/2009 | Wang et al. | 375/224 |
| 7,656,205 B2 | 2/2010 | Chen et al. | |
| 7,659,003 B2 | 2/2010 | Aoki et al. | |
| 7,664,085 B2 | 2/2010 | Waxman | |
| 7,672,645 B2 | 3/2010 | Kilpatrick et al. | |
| 7,689,190 B2 | 3/2010 | Kerth et al. | |
| 7,711,004 B2 | 5/2010 | Xu | |
| 7,717,342 B2 | 5/2010 | Wang | |
| 7,725,118 B2 | 5/2010 | Yang et al. | |
| 7,734,253 B2 | 6/2010 | Chen et al. | |
| 7,777,624 B2 * | 8/2010 | Wu et al. | 340/554 |
| 7,826,411 B2 | 11/2010 | Gonikberg et al. | |
| 7,844,222 B2 | 11/2010 | Grushkevich | |
| 7,849,333 B2 | 12/2010 | Schindler | |
| 7,876,786 B2 | 1/2011 | Bahl et al. | |
| 7,881,746 B2 | 2/2011 | Desai | |
| 7,898,948 B2 | 3/2011 | DiGirolamo et al. | |
| 7,936,714 B1 | 5/2011 | Karr et al. | |
| 7,957,340 B2 | 6/2011 | Choi et al. | |
| 7,966,036 B2 | 6/2011 | Kojima | |
| 7,983,216 B2 | 7/2011 | Iyer et al. | |
| 7,995,544 B2 | 8/2011 | Benveniste | |
| 8,000,715 B2 | 8/2011 | Melpignano et al. | |
| 8,014,329 B2 | 9/2011 | Gong | |
| 8,045,922 B2 | 10/2011 | Sherman et al. | |
| 8,046,024 B2 | 10/2011 | Sudak et al. | |
| 8,060,017 B2 | 11/2011 | Schlicht et al. | |
| 8,072,913 B2 | 12/2011 | Desai | |
| 8,073,388 B2 | 12/2011 | Grushkevich et al. | |
| 8,077,652 B2 | 12/2011 | Thesling | |
| 8,078,111 B2 | 12/2011 | Jovicic et al. | |
| 8,081,038 B2 | 12/2011 | Lee et al. | |
| 8,085,737 B2 | 12/2011 | Zhu | |
| 8,107,391 B2 | 1/2012 | Wu et al. | |
| 8,121,144 B2 | 2/2012 | Bitran | |
| 8,126,502 B2 | 2/2012 | Trainin | |
| 8,139,670 B1 | 3/2012 | Son et al. | |
| 8,140,075 B2 | 3/2012 | Watanabe | |
| 8,149,715 B1 | 4/2012 | Goel et al. | |
| 8,150,328 B2 | 4/2012 | Chaudhri et al. | |
| 8,159,928 B2 | 4/2012 | Gorokhov et al. | |
| 8,165,102 B1 | 4/2012 | Vleugels et al. | |
| 8,170,002 B2 | 5/2012 | Wentink | |
| 8,170,546 B2 | 5/2012 | Bennett | |
| 8,189,506 B2 | 5/2012 | Kneckt et al. | |
| 8,189,526 B2 | 5/2012 | Hsu et al. | |
| 8,204,015 B2 | 6/2012 | Chaudhri et al. | |
| 8,219,142 B2 | 7/2012 | Khairmode et al. | |
| 8,229,087 B2 | 7/2012 | Sumioka et al. | |
| 8,233,928 B2 | 7/2012 | Stanforth et al. | |
| 8,254,296 B1 | 8/2012 | Lambert et al. | |
| 8,256,681 B2 | 9/2012 | Wang | |
| 8,274,885 B2 | 9/2012 | Wu et al. | |
| 8,274,894 B2 | 9/2012 | Kneckt et al. | |
| 8,275,314 B1 | 9/2012 | Lin | |
| 8,310,967 B1 | 11/2012 | Goel | |
| 8,315,564 B2 | 11/2012 | Banerjea | |
| 8,340,034 B1 | 12/2012 | Lee | |
| 8,364,188 B2 | 1/2013 | Srinivasan et al. | |
| 8,369,782 B1 | 2/2013 | Lin et al. | |
| 8,442,434 B2 | 5/2013 | Grushkevich et al. | |
| 8,451,776 B2 | 5/2013 | Dayal et al. | |
| 8,472,427 B1 | 6/2013 | Wheeler et al. | |
| 8,472,968 B1 | 6/2013 | Kim | |
| 8,483,190 B2 | 7/2013 | Donovan | |
| 8,493,966 B2 | 7/2013 | Bendelac | |
| 8,493,992 B2 | 7/2013 | Sella et al. | |
| 8,496,181 B2 | 7/2013 | Wang | |
| 8,526,348 B2 | 9/2013 | Desai | |
| 8,532,041 B1 | 9/2013 | Lambert et al. | |
| 8,537,798 B2 | 9/2013 | Tsfati et al. | |
| 8,537,799 B2 | 9/2013 | Tsfati et al. | |
| 8,553,561 B1 | 10/2013 | Chokshi et al. | |
| 8,571,479 B2 | 10/2013 | Banerjea | |
| 8,577,305 B1 | 11/2013 | Rossi et al. | |
| 8,588,705 B1 * | 11/2013 | Tsui et al. | 455/69 |
| 8,599,814 B1 | 12/2013 | Vleugels et al. | |
| 8,600,324 B1 | 12/2013 | Cousinard et al. | |
| 8,619,732 B2 | 12/2013 | Khairmode et al. | |
| 8,626,067 B2 | 1/2014 | Ko et al. | |
| 8,649,734 B1 | 2/2014 | Lin et al. | |
| 8,654,773 B2 | 2/2014 | Wentink et al. | |
| 8,655,278 B2 | 2/2014 | Laroche et al. | |
| 8,655,279 B2 | 2/2014 | Banerjea | |
| 8,665,848 B2 | 3/2014 | Wentink | |
| 8,699,430 B2 | 4/2014 | Chandramouli et al. | |
| 8,730,927 B2 | 5/2014 | Thoukydides | |
| 8,750,926 B2 | 6/2014 | Fu et al. | |
| 8,767,616 B2 | 7/2014 | Choi et al. | |
| 8,805,303 B2 | 8/2014 | Koo et al. | |
| 8,811,318 B2 | 8/2014 | Jo et al. | |
| 8,842,618 B2 | 9/2014 | Yu et al. | |
| 8,867,481 B2 | 10/2014 | Banerjea et al. | |
| 8,897,706 B1 | 11/2014 | Lin et al. | |
| 8,913,599 B2 | 12/2014 | Gonikberg et al. | |
| 8,923,788 B1 | 12/2014 | Cousinard et al. | |
| 8,982,826 B1 | 3/2015 | Lambert et al. | |
| 8,983,557 B1 | 3/2015 | Sun et al. | |
| 8,989,669 B2 | 3/2015 | Banerjea | |
| 9,026,162 B2 | 5/2015 | Wagholikar et al. | |
| 9,055,460 B1 | 6/2015 | Kim | |

(56) References Cited

U.S. PATENT DOCUMENTS

| | | |
|---|---|---|
| 9,066,369 B1 | 6/2015 | Nemavat et al. |
| 9,125,216 | 9/2015 | Choi et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2004/0044489 A1* | 3/2004 | Jones et al. ............ 702/79 |
| 2004/0063403 A1 | 4/2004 | Durrant |
| 2004/0105401 A1 | 6/2004 | Lee |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0259589 A1 | 12/2004 | Bahl et al. |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0038876 A1 | 2/2005 | Chaudhuri |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0215197 A1 | 9/2005 | Chen et al. |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0264959 A1 | 11/2007 | Carrez |
| 2007/0268862 A1 | 11/2007 | Singh et al. |
| 2007/0280471 A1* | 12/2007 | Fallahi et al. ............ 379/399.01 |
| 2007/0286298 A1 | 12/2007 | Choi et al. |
| 2007/0297388 A1 | 12/2007 | Appaji et al. |
| 2008/0022162 A1 | 1/2008 | Qiu |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279138 A1 | 11/2008 | Gonikberg et al. |
| 2008/0279162 A1 | 11/2008 | Desai |
| 2008/0279163 A1 | 11/2008 | Desai |
| 2008/0280638 A1 | 11/2008 | Malladi et al. |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0030976 A1 | 1/2009 | Shukla et al. |
| 2009/0067396 A1 | 3/2009 | Fischer |
| 2009/0137206 A1 | 5/2009 | Sherman et al. |
| 2009/0143043 A1 | 6/2009 | Yoshizaki et al. |
| 2009/0147763 A1 | 6/2009 | Desai et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0202013 A1 | 8/2009 | Sebastian |
| 2009/0209288 A1 | 8/2009 | Rofougaran |
| 2009/0235316 A1 | 9/2009 | Wu et al. |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0275299 A1 | 11/2009 | Buch et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0291690 A1 | 11/2009 | Guvenc et al. |
| 2009/0311961 A1 | 12/2009 | Banerjea |
| 2009/0312027 A1 | 12/2009 | Foschini et al. |
| 2009/0321056 A1 | 12/2009 | Ran et al. |
| 2009/0325591 A1 | 12/2009 | Liu et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0130129 A1 | 5/2010 | Chang et al. |

(56) References Cited

U.S. PATENT DOCUMENTS

| | | |
|---|---|---|
| 2010/0135256 A1 | 6/2010 | Lee et al. |
| 2010/0138549 A1 | 6/2010 | Goel et al. |
| 2010/0165896 A1 | 7/2010 | Gong et al. |
| 2010/0189165 A1 | 7/2010 | Xu et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0284355 A1 | 11/2010 | Jung et al. |
| 2010/0293293 A1 | 11/2010 | Beser |
| 2010/0303026 A1 | 12/2010 | Chaudhri et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0026488 A1 | 2/2011 | Patel et al. |
| 2011/0053522 A1 | 3/2011 | Rofougaran et al. |
| 2011/0097998 A1 | 4/2011 | Ko et al. |
| 2011/0103363 A1 | 5/2011 | Bennett |
| 2011/0116488 A1 | 5/2011 | Grandhi |
| 2011/0161697 A1 | 6/2011 | Qi et al. |
| 2011/0164538 A1 | 7/2011 | Karr et al. |
| 2011/0188391 A1 | 8/2011 | Sella et al. |
| 2011/0194519 A1 | 8/2011 | Habetha |
| 2011/0205924 A1 | 8/2011 | Gonikberg et al. |
| 2011/0274040 A1 | 11/2011 | Pani et al. |
| 2012/0020319 A1 | 1/2012 | Song et al. |
| 2012/0025921 A1 | 2/2012 | Yang et al. |
| 2012/0039176 A1 | 2/2012 | Eshan et al. |
| 2012/0087341 A1 | 4/2012 | Jang et al. |
| 2012/0099476 A1 | 4/2012 | Mahaffy |
| 2012/0115420 A1 | 5/2012 | Trainin |
| 2012/0195397 A1 | 8/2012 | Sayana et al. |
| 2012/0212628 A1 | 8/2012 | Wu et al. |
| 2012/0213162 A1 | 8/2012 | Koo et al. |
| 2012/0213208 A1 | 8/2012 | Hsu et al. |
| 2012/0244805 A1 | 9/2012 | Haikonen et al. |
| 2012/0276938 A1 | 11/2012 | Wagholikar et al. |
| 2012/0294396 A1 | 11/2012 | Desai |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0130684 A1 | 5/2013 | Gomes et al. |
| 2013/0176903 A1 | 7/2013 | Bijwe |
| 2013/0217401 A1 | 8/2013 | Edge et al. |
| 2013/0225068 A1 | 8/2013 | Kiminki et al. |
| 2013/0287043 A1 | 10/2013 | Nanda et al. |
| 2013/0301420 A1 | 11/2013 | Zhang et al. |
| 2014/0003318 A1 | 1/2014 | Desai |
| 2014/0004794 A1 | 1/2014 | Contaldo et al. |
| 2014/0043966 A1 | 2/2014 | Lee et al. |
| 2014/0044106 A1 | 2/2014 | Bhagwat |
| 2014/0073251 A1 | 3/2014 | Banerjea |
| 2014/0087663 A1 | 3/2014 | Burchill et al. |
| 2014/0126552 A1 | 5/2014 | Dayal et al. |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Advisory Action", U.S. Appl. No. 12/190,251, (Dec. 7, 2011),3 pages.

"Advisory Action", U.S. Appl. No. 12/646,721, (Aug. 13, 2013),3 pages.

"Draft Standard for Information Technology—Telecommunications and information exchange between systems—Local and metropolitan area networks—Specific requirements", *IEEE* P802.11s/D1.03, (Apr. 2007),251 pages.

"Final Office Action", U.S. Appl. No. 12/186,429, (Oct. 13, 2011),23 pages.

"Final Office Action", U.S. Appl. No. 12/190,251, (Sep. 13, 2011),15 pages.

"Final Office Action", U.S. Appl. No. 12/323,292, (Aug. 24, 2012),26 pages.

"Final Office Action", U.S. Appl. No. 12/358,955, (Feb. 17, 2012),26 pages.

"Final Office Action", U.S. Appl. No. 12/358,955, (Mar. 18, 2013),12 pages.

"Final Office Action", U.S. Appl. No. 12/484,563, (Apr. 24, 2012),18 pages.

"Final Office Action", U.S. Appl. No. 12/487,425, (May 3, 2012),9 pages.

"Final Office Action", U.S. Appl. No. 12/534,361, (Feb. 29, 2012),13 pages.

"Final Office Action", U.S. Appl. No. 12/542,845, (Sep. 25, 2012),23 pages.

"Final Office Action", U.S. Appl. No. 12/616,454, (Apr. 11, 2012),19 pages.

"Final Office Action", U.S. Appl. No. 12/646,721, (Jun. 6, 2013),16 pages.

"Final Office Action", U.S. Appl. No. 12/646,802, (Nov. 15, 2012),15 pages.

"Final Office Action", U.S. Appl. No. 12/759,336, (Feb. 25, 2013),11 pages.

"Foreign Office Action", CN Application No. 200980122587.0, (Sep. 10, 2013),11 Pages.

"Foreign Notice of Allowance", Japanese Application No. 2011-513586, (Jul. 16, 2013),2 pages.

"Foreign Office Action", CN Application No. 200980122587.0, (Feb. 21, 2013),17 pages.

"Foreign Office Action", EP Application No. 09789754.0, (May 17, 2011),8 pages.

"Foreign Office Action", European Patent Application No. 09789754.0, (Jul. 12, 2012),4 pages.

"Foreign Office Action", European Patent Application No. 09789754.0, (Mar. 11, 2013),4 Pages.

"Foreign Office Action", Japanese Application No. 2011-513586, (Oct. 23, 2012),7 pages.

"Foreign Office Action", Japanese Application No. 2011-513586, (Apr. 9, 2013),4 Pages.

"Further Higher Data Rate Extension in the 2.4 GHz Band", *IEEE* P802.11g/D8.2, Draft Supplement to Standard [for] Information Technology,(Apr. 2003),69 pages.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", *IEEE Computer Society*, (Oct. 14, 2010),pp. 12-18, 23, 65-68.

"Information Technology—Telecommunications and Information Exchange Between systems—Local and Metropolitan Area Networks—Specific Requirements", *IEEE Standard*, (Aug. 1, 2005),pp. 1-60.

(56) References Cited

OTHER PUBLICATIONS

"Information Technology—Telecommunications and Information Exchange between Systems—Local and Metropolitan Area Networks—Specific Requirements", *Part 11: Wireless LAN Medium Access Control (MAC) and Physical Layer (PHY) Specifications*, IEEE Standard 802.11h-2003 (Amendment to IEEE Std 802.11-1993),(Oct. 14, 2003),80 pages.

"International Search Report and Written Opinion", PCT Application PCT/US2012/035597, (Aug. 6, 2012),13 pages.

"Non-Final Office Action", U.S. Appl. No. 13/429,090, (Oct. 24, 2013),13 pages.

"Non-Final Office Action", U.S. Appl. No. 12/167,841, (Jul. 15, 2011),10 pages.

"Non-Final Office Action", U.S. Appl. No. 12/186,429, (Apr. 25, 2011),19 pages.

"Non-Final Office Action", U.S. Appl. No. 12/190,240, (Jan. 6, 2012),7 pages.

"Non-Final Office Action", U.S. Appl. No. 12/190,251, (Mar. 29, 2011),8 pages.

"Non-Final Office Action", U.S. Appl. No. 12/190,251, (Mar. 29, 2012),11 pages.

"Non-Final Office Action", U.S. Appl. No. 12/235,333, (Jun. 28, 2011),16 pages.

"Non-Final Office Action", U.S. Appl. No. 12/323,292, (Dec. 21, 2011),17 pages.

"Non-Final Office Action", U.S. Appl. No. 12/358,955, (Sep. 6, 2011),24 pages.

"Non-Final Office Action", U.S. Appl. No. 12/358,955, (Aug. 20, 2012),33 pages.

"Non-Final Office Action", U.S. Appl. No. 12/478,446, (Dec. 28, 2011),17 pages.

"Non-Final Office Action", U.S. Appl. No. 12/484,563, (Oct. 4, 2011),13 pages.

"Non-Final Office Action", U.S. Appl. No. 12/487,425, (Jan. 12, 2012),7 pages.

"Non-Final Office Action", U.S. Appl. No. 12/534,361, (Oct. 12, 2011),11 pages.

"Non-Final Office Action", U.S. Appl. No. 12/542,845, (Oct. 23, 2013),29 pages.

"Non-Final Office Action", U.S. Appl. No. 12/542,845, (Apr. 4, 2012),19 pages.

"Non-Final Office Action", U.S. Appl. No. 12/616,454, (Dec. 22, 2011),8 pages.

"Non-Final Office Action", U.S. Appl. No. 12/646,721, (Nov. 7, 2012),15 pages.

"Non-Final Office Action", U.S. Appl. No. 12/646,721, (May 10, 2012),15 pages.

"Non-Final Office Action", U.S. Appl. No. 12/646,802, (Mar. 29, 2012),16 pages.

"Non-Final Office Action", U.S. Appl. No. 12/732,036, (Aug. 9, 2012),13 pages.

"Non-Final Office Action", U.S. Appl. No. 12/759,336, (Oct. 4, 2012),13 pages.

"Non-Final Office Action", U.S. Appl. No. 12/883,054, (Nov. 22, 2013),18 pages.

"Non-Final Office Action", U.S. Appl. No. 13/099,169, (Mar. 28, 2013),12 pages.

"Non-Final Office Action", U.S. Appl. No. 13/099,169, (Oct. 4, 2013),9 pages.

"Non-Final Office Action", U.S. Appl. No. 13/249,740, (Mar. 26, 2013),9 pages.

"Non-Final Office Action", U.S. Appl. No. 13/249,740, (Oct. 16, 2013),9 pages.

"Non-Final Office Action", U.S. Appl. No. 13/479,124, (Sep. 27, 2013),14 pages.

"Non-Final Office Action", U.S. Appl. No. 13/604,563, (Apr. 5, 2013),6 pages.

"Non-Final Office Action", U.S. Appl. No. 13/656,482, (Mar. 19, 2013),19 pages.

"Non-Final Office Action", U.S. Appl. No. 13/656,502, (Feb. 21, 2013),6 pages.

"Non-Final Office Action", U.S. Appl. No. 13/757,276, (Jan. 30, 2014),9 pages.

"Non-Final Office Action", U.S. Appl. No. 13/911,979, (Jan. 31, 2014),19 pages.

"Notice of Allowance", U.S. Appl. No. 12/167,841, (Nov. 25, 2011),11 pages.

"Notice of Allowance", U.S. Appl. No. 12/186,429, (Jun. 6, 2013),9 pages.

"Notice of Allowance", U.S. Appl. No. 12/190,240, (May 16, 2012),4 pages.

"Notice of Allowance", U.S. Appl. No. 12/190,251, (Oct. 4, 2012),6 pages.

"Notice of Allowance", U.S. Appl. No. 12/235,333, (Nov. 15, 2011),5 pages.

"Notice of Allowance", U.S. Appl. No. 12/323,292, (Jun. 28, 2013),8 pages.

"Notice of Allowance", U.S. Appl. No. 12/358,955, (Jul. 1, 2013),8 pages.

"Notice of Allowance", U.S. Appl. No. 12/478,446, (Jun. 14, 2012),6 pages.

"Notice of Allowance", U.S. Appl. No. 12/484,563, (Jul. 9, 2012),6 pages.

"Notice of Allowance", U.S. Appl. No. 12/487,425, (Jul. 26, 2013),9 pages.

"Notice of Allowance", U.S. Appl. No. 12/534,361, (Feb. 14, 2013),12 pages.

"Notice of Allowance", U.S. Appl. No. 12/616,454, (Aug. 22, 2012),4 pages.

"Notice of Allowance", U.S. Appl. No. 12/716,569, (Apr. 19, 2012),7 pages.

"Notice of Allowance", U.S. Appl. No. 12/732,036, (Feb. 21, 2013),8 pages.

"Notice of Allowance", U.S. Appl. No. 12/759,336, (May 3, 2013),9 pages.

"Notice of Allowance", U.S. Appl. No. 13/604,563, (Sep. 26, 2013),5 pages.

"Notice of Allowance", U.S. Appl. No. 13/656,482, (Sep. 3, 2013),8 pages.

"Notice of Allowance", U.S. Appl. No. 13/656,502, (Jun. 25, 2013),11 pages.

"Part 11: Wireless LAN Medium Access Control (MAC) and Physical Layer (PHY) specifications", *IEEE* Std 802.11a-1999, High-speed Physical Layer in the 5 GHz Band,(1999),91 pages.

"Part 11: Wireless LAN Medium Access Control (MAC) and Physical Layer (PHY) specifications", *IEEE* Std 802.11b-1999/Cor 1-2001, Amendment 2: Higher-speed Physical Layer (PHY) extension in the 2.4 GHz band,(Nov. 7, 2001),23 pages.

"Part 11: Wireless LAN Medium Access Control (MAC) and Physical Layer (PHY) specifications", Information technology—Telecommunications and information exchange between systems—Local and metropolitan area networks—Specific requirements—, IEEE,(Apr. 2003),pp. 1-69.

"PCT Search Report and Written Opinion", Application No. PCT/IB2013/000390, (Aug. 21, 2013),19 Pages.

"PCT Search Report and Written Opinion", Application No. PCT/US2011/054358, (Dec. 16, 2011),13 pages.

"PCT Search Report and Written Opinion", Application No. PCT/US2013/025144, (Jun. 5, 2013),10 pages.

"PCT Search Report", Application No. PCT/US2009/046289 (Oct. 29, 2009),13 pages.

"Restriction Requirement", U.S. Appl. No. 12/167,841, (May 12, 2011),6 pages.

"Search Report", European Application No. 13169350.9, (Aug. 13, 2013),10 Pages.

"Supplemental Notice of Allowance", U.S. Appl. No. 12/186,429, (Jul. 10, 2013),2 pages.

"Supplemental Notice of Allowance", U.S. Appl. No. 12/323,292, (Oct. 7, 2013),2 pages.

"Supplemental Notice of Allowance", U.S. Appl. No. 12/323,292, (Oct. 17, 2013),2 pages.

(56) References Cited

OTHER PUBLICATIONS

"Supplemental Notice of Allowance", U.S. Appl. No. 12/358,955, (Oct. 11, 2013),3 pages.
"Supplemental Notice of Allowance", U.S. Appl. No. 12/716,569, (Jul. 23, 2012),2 pages.
"Supplemental Notice of Allowance", U.S. Appl. No. 12/759,336, (Jun. 5, 2013),2 pages.
"Supplemental Notice of Allowance", U.S. Appl. No. 12/759,336, (Jun. 18, 2013),2 pages.
"Supplemental Notice of Allowance", U.S. Appl. No. 12/759,336, (Aug. 14, 2013),2 pages.
"Supplemental Notice of Allowance", U.S. Appl. No. 13/656,482, (Nov. 29, 2013),2 pages.
"Supplemental Notice of Allowance", U.S. Appl. No. 13/656,482, (Dec. 19, 2013),2 pages.
Haas, Zygmunt J., et al., "Gossip-Based Ad Hoc Routing", *IEEE/ACM Transactions on Networking*, vol. 14, No. 3, (Jun. 2006),pp. 479-491.
Jung, Eun-Sun et al., "A Power Control MAC Protocol for Ad Hoc Networks", *In Proceedings of MOBICOM 2002*, (Sep. 23, 2002),pp. 36-47.
Jung, Eun-Sun et al., "A Power Control MAC Protocol for Ad Hoc Networks", *Wireless Networks ; The Journal of Mobile Communication, Computation and Information, Kluwer Academic Publishers* vol. 11, No. 1-2, (Jan. 1, 2005),12 Pages.
Mazzanti, Andrea et al., "Analysis and Design of Injection-Locked LC Dividers for Quadrature Generation", *IEEE Journal of Solid-State Circuits*, vol. 39, No. 9, (Sept 2004),pp. 1425-1433.
Mujtaba, Syed A., "TGn Sync Proposal Technical Specification", *IEEE* 802.11-04/0889r6, This document presents the technical specification for the MAC and the PHY layer of the TGn Sync proposal to IEEE 802.11 TGn,(May 18, 2005),pp. 1-131.
Mujtaba, Syed A., "TGn Sync Proposal Technical Specification", *IEEE 802.11-04 / Wireless LANs*, (May 2005),pp. 1-131.
Qiao, Daji et al., "Interference Analysis and Transmit Power Control in IEEE 802.11a/h Wireless LANs", *IEEE / ACM Transactions on Networking, IEEE / ACM*, New York, NY, US, vol. 15. No. 5, (Oct. 1, 2007),14 Pages.
Tinnirello, Ilenia et al., "Revisit of RTS / CTS Exchange in High-Speed IEEE 802.11 Networks", *World of Wireless Mobile and Multimedia Networks. 2005. Wowmom 2005. Sixth IEEE International Symposium on a Taormina-Giardini Naxos*, Italy Jun. 13-16, 2005 Piscataway, NJ, International USA,IEEE, Los Alamitos, CA, USA, (Jun. 13, 2005),10 Pages.
"Foreign Office Action", CN Application No. 200980122587.0, Jan. 24, 2014, 10 Pages.
"International Search Report and Written Opinion", Application No. PCT/IB2013/001962, Feb. 6, 2014, 11 Pages.
"Final Office Action", U.S. Appl. No. 12/883,054, Jun. 9, 2014, 22 pages.
"Foreign Office Action", EP Application No. 13169350.9, May 9, 2014, 3 Pages.
"Non-Final Office Action", U.S. Appl. No. 13/458,227, Jul. 3, 2014, 10 pages.
"Non-Final Office Action", U.S. Appl. No. 13/536,506, Apr. 25, 2014, 12 pages.
"Non-Final Office Action", U.S. Appl. No. 13/911,979, Jun. 9, 2014, 11 pages.
"Non-Final Office Action", U.S. Appl. No. 14/089,515, May 13, 2014, 9 pages.
"Notice of Allowance", U.S. Appl. No. 13/757,276, Jul. 8, 2014, 6 pages.
"Foreign Office Action", CN Application No. 200980122587.0, Jul. 3, 2014, 12 Pages.
"Non-Final Office Action", U.S. Appl. No. 12/883,054, Sep. 11, 2014, 29 pages.
"Non-Final Office Action", U.S. Appl. No. 13/622,916, Sep. 10, 2014, 10 pages.
"Non-Final Office Action", U.S. Appl. No. 14/018,232, Aug. 13, 2014, 6 pages.
"Non-Final Office Action", U.S. Appl. No. 14/063,972, Sep. 24, 2014, 6 pages.
"Notice of Allowance", U.S. Appl. No. 13/536,506, Sep. 19, 2014, 7 pages.
"Notice of Allowance", U.S. Appl. No. 14/089,515, Aug. 21, 2014, 4 pages.
"Corrected Notice of Allowance", U.S. Appl. No. 14/063,972, Jan. 26, 2015, 2 pages.
"Foreign Office Action", CN application No. 200980122587.0, Dec. 3, 2014, 10 pages.
"Non-Final Office Action", U.S. Appl. No. 13/761,949, Jan. 12, 2015, 16 pages.
"Notice of Allowance", U.S. Appl. No. 13/458,227, Jan. 2, 2015, 7 pages.
"Notice of Allowance", U.S. Appl. No. 13/911,979, Nov. 20, 2014, 12 pages.
"Notice of Allowance", U.S. Appl. No. 14/018,232, Nov. 5, 2014, 7 pages.
"Notice of Allowance", U.S. Appl. No. 14/063,972, Nov. 7, 2014, 8 pages.
"Supplemental Notice of Allowance", U.S. Appl. No. 13/757,276, Oct. 24, 2014, 2 pages.
"Corrected Notice of Allowance", U.S. Appl. No. 14/063,972, Feb. 25, 2015, 2 pages.
"Notice of Allowance", U.S. Appl. No. 12/883,054, Feb. 9, 2015, 12 pages.
"Notice of Allowance", U.S. Appl. No. 13/622,916, Mar. 30, 2015, 4 pages.
"Restriction Requirement", U.S. Appl. No. 14/071,171, Apr. 27, 2015, 6 pages.
"Amendment 3: Enhancements for Very High Throughput In the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601 pages.
"Amendment 4: TV White Spaces Operation", The Institute of Electrical and Electronics Engineers, Inc., IEEE STD P802.11af/D1.05 Draft Standard for Information Technology-Telecommunications and Information Exchange Between Systems-Local and Metropolitan area networks—Specific Requirements, Part 11: Wireless LAN Medium Access Control (MAC) and Physical Layer, Nov. 2011, 123 Pages.
"Amendment 5: Enhancements for Very High Throughput for Operation in Bands below 6 GHz", Prepared by the 802.11 Working Group of the 802 Committee, IEEE P802.11 ac™/D0.2 Draft Standard for Information Technology—IEEE P802.11ac/D0.2. Mar. 2011 Telecommunications and information exchange between systems-Local and metropolitan area networks Specific requirements Part 11: Wireless LAN Medium Access Co, Mar. 2011, 184 Pages.
"Amendment 5: Protected Management Frames", Prepared by: IEEE 802 Committee of the IEEE Computer Society, P802.11w™/D4.0 Draft Standard for Information Technology-Telecommunications and information exchange between systems-Local and metropolitan area networks-Specific requirements—Part 11: Wireless LAN Medium Access Control (MAC) and Physical Layer (PHY) spec, Nov. 2007, 63 Pages.
"Amendment 6: Medium Access Control (MAC) Security Enhancements", Prepared by the LAN/MAN Standards Committee of the IEEE Computer Society, IEEE Standard for Information Technology Telecommunications and information exchange between systems—Local and metropolitan area networks Specific requirements Part 11: Wireless Lan Medium Access Control (MAC) and Physical Layer (PHY) specifications, Jul. 23, 2004, 190 Pages.
"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.

(56) References Cited

OTHER PUBLICATIONS

"Amendment 7: Medium Access Control (MAC) Quality of Service (QoS) Enhancements", Prepared by the LAN/MAN Standards Committee of the IEEE Computer Society, IEEE Standard for Information Technology—Telecommunications and information exchange between systems-Local and metropolitan area networks Specific requirements Part 11: Wireless Medium Access Control, Oct. 2004, 195 Pages.

"Amendment 8: IEEE 802.11 Wireless Network Management", Prepared by the LAN/MAN Standards Committee of the IEEE Computer Society, Draft Standard for Information technology Telecommunications and information exchange between systems-Local and metropolitan area networks Specific requirements-Part 11: Wireless LAN Medium Access Control (MAC) and Physical Layer (PHY) specifications, Aug. 2010, 426 Pages.

"Higher-Speed Physical Layer Extension in the 2.4 GHz Band", LAN/MAN Standards Committee of the IEEE Computer Society, IEEE Std 802.11b Supplement to Standard for Information Technology-Telecommunications and Information Exchange Between Systems-Local and Metropolitan area networks- Specific Requirements, Part 11: Wireless LAN Medium Access Control (MAC) and Physical Layer, Sep. 16, 1999, 96 Pages.

"IEEE P802.11ac (Tm) / D2.0", Draft STANDARD for Information Technology—Telecommunications and information exchange between systems—Local and metropolitan area networks- Specific Requirements / Part 11: Wireless LAN Medium Control (MAC) and Physical Layer (PHY) specifications / Am, Jan. 2012, 359 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k-2008, Jun. 12, 2008, 244 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"Non-Final Office Action", U.S. Appl. No. 13/932,797, Jul. 2, 2015, 7 pages.

"Notice of Allowance", U.S. Appl. No. 13/761,949, Jul. 28, 2015, 8 pages.

"Supplemental Notice of Allowance", U.S. Appl. No. 13/622,916, May 7, 2015, 2 pages.

"Supplemental Notice of Allowance", U.S. Appl. No. 13/622,916, Jul. 10, 2015, 2 pages.

Gunman,"Multi-Rate Layered Decoder Architecture for Block LDPC Codes of the IEEE 802.11n Wireless Standard", Department of Electrical and Computer Engineering Texas A&M University, 2007, 4 Pages.

\* cited by examiner

DETERMINING POWER OVER ETHERNET IMPAIRMENT

RELATED APPLICATION

This application claims is a continuation of and claims priority to U.S. Utility patent application Ser. No. 12/323,292 filed Nov. 25, 2008 which claims priority to U.S. Provisional Patent Application Ser. No. 61/007,240 filed Dec. 11, 2007, the disclosure of which are incorporated by reference herein in their entirety.

BACKGROUND

Aspects of the present invention relate generally to Power over Ethernet technologies, and more particularly to a system and method of determining an unbalanced current condition in Power over Ethernet applications.

Recent technological and market developments have resulted in a growing interest in Power over Ethernet (PoE) applications such that many network equipment manufacturers and systems integrators are endeavoring to design and implement enhancements to PoE. PoE has been standardized in a specification promulgated by the Institute of Electrical and Electronics Engineers (IEEE), specifically, the IEEE 802.3af standard for providing power to data terminal equipment (DTE) via a medium dependent interface (MDI).

In operation, PoE is similar to that of a traditional telephone network in which operating power necessary for the electrical components in the telephone is delivered from the central office through the telephone cable, i.e., it is not necessary to couple the telephone to an independent external power source. In PoE implementations, power is typically delivered to DTE devices from Ethernet switches or power sourcing equipment (PSE) via the local area network (LAN) cabling itself. Operating power provided through the LAN cables is then employed to power Internet Protocol (IP) telephones, wireless access points, security or web cameras, and the like. This technology does not require alteration of the Ethernet infrastructure, and eliminates the requirement that networked DTE devices be supplied with operating current from an independent external power source.

It is expected that the existing IEEE 802.3af standard will soon be augmented by another specification, IEEE 802.3at (or PoE+), which is under development. As currently contemplated, PoE+ will support increased current requirements, and accordingly, some of the challenges associated with supplying direct current (DC) power over category 5 (Cat5) or category 3 (Cat3) network cables will be exacerbated by the higher current levels prescribed by IEEE 802.3at. One potential impediment is a current mismatch between the positive and negative (+/−) wires of a given twisted pair. In some instances where the current is not equal, a net induced magnetic field can saturate transformers and decrease effective open circuit inductance (OCL), thus causing droop and other signaling degradation. Various factors may influence such a current mismatch including, but not limited to, different respective resistances in the +/− wires, and different contact qualities or contact resistances at the connections. Regardless of the source of the mismatch, however, the end result is the same; attendant signal degradation can cause packet errors or even link instability or failure.

Hence, it may be desirable in some circumstances to provide a method and system that effectively identify an unbalanced current condition in PoE applications.

SUMMARY

Embodiments of the present invention overcome the above-mentioned and various other shortcomings of conventional technology, providing a system and method of determining an unbalanced current condition in Power over Ethernet applications. In some implementations, a user or network administrator may be notified of potential impairments due to unbalanced current.

In accordance with one embodiment, a method of determining an impairment in a Power over Ethernet application may generally comprise monitoring operation of an echo canceller associated with a PHY device, determining when an echo energy reflected back to the device is above a threshold, and triggering an alert responsive to the determination. Either a power sourcing equipment device or a data terminal equipment device may be configured to perform the forgoing method.

In accordance with another embodiment, a device for use in a Power over Ethernet application may generally comprise: a transmitter; a receiver; an echo canceller to remove echo energy from a signal received at the receiver; and a tap monitor to monitor operation of the echo canceller; wherein output from the tap monitor may be employed to trigger an alert responsive to a determination that the echo energy is above a threshold.

The foregoing and other aspects of various embodiments of the present invention will be apparent through examination of the following detailed description thereof in conjunction with the accompanying drawing figures.

DETAILED DESCRIPTION

While the possibility of unbalanced current resulting in transformer saturation in PoE implementations is generally known, no single solution has been adopted by the industry. Many solutions have been proposed to address this issue, and several are under active consideration at the IEEE 802.3at development meetings. The proposed solutions generally involve additions or alterations of the magnetics or of the physical (PHY) layers of the power sourcing equipment (PSE) or the powered devices (or data terminal equipment (DTE)). Additionally, most proposed solutions waste power by implementing resistors added to the magnetics path. While potentially feasible, these strategies to eliminate or to minimize the effects of unbalanced current in PoE have associated cost and size penalties that cannot be avoided. In contrast, embodiments of the invention set forth herein do not increase the size or the cost of the transformers and the PHY layer components, and will not waste any power.

Figure 1:
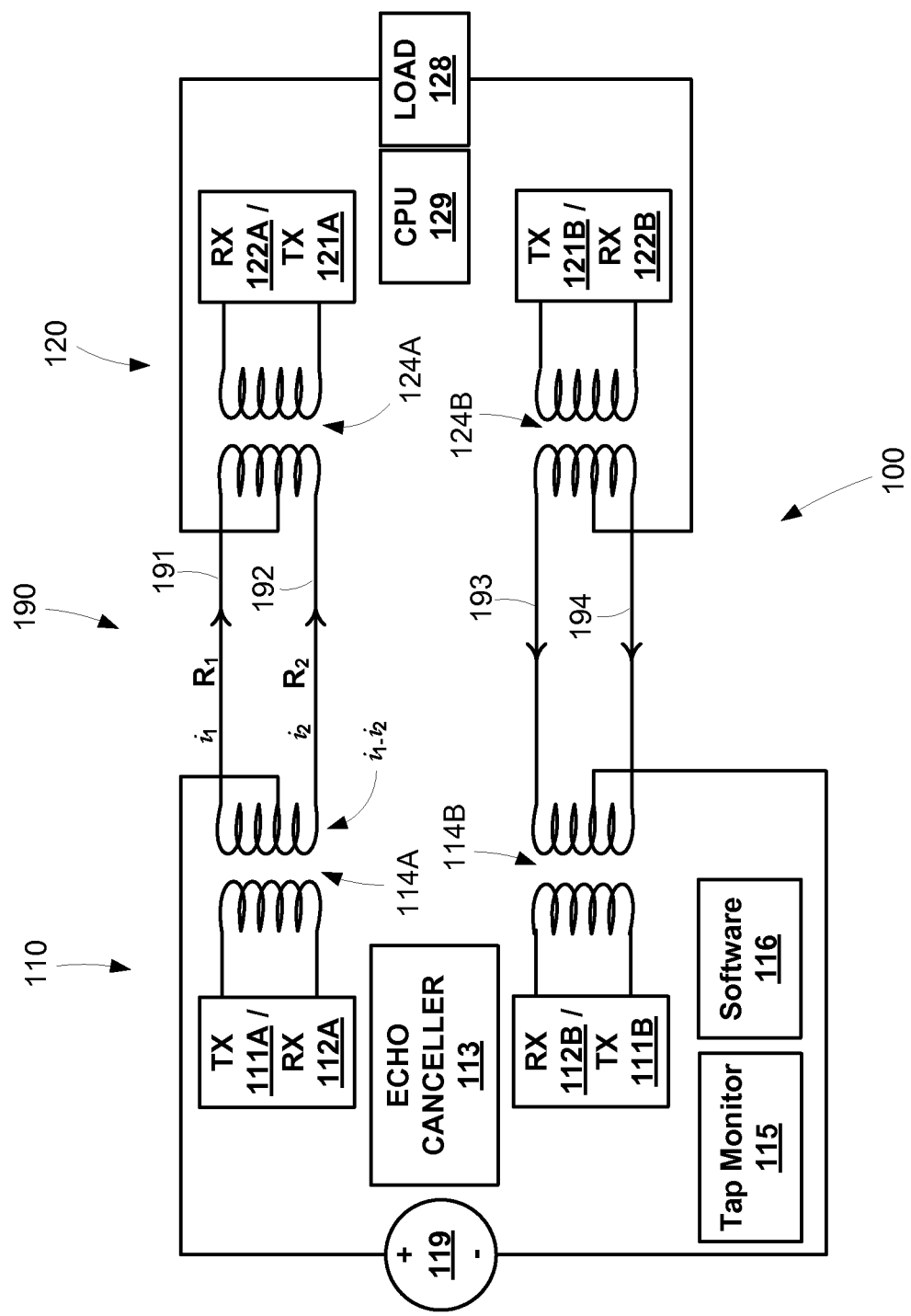
FIG. 1 is a simplified block diagram illustrating components of one embodiment of a Power over Ethernet architecture.

Turning now to the drawing figures, FIG. 1 is a simplified block diagram illustrating components of one embodiment of a Power over Ethernet architecture. In the FIG. 1 embodiment, PoE architecture 100 generally comprises a PSE device 110 coupled to a DTE device 120 via a network cable 190.

In accordance with one embodiment, the PHY layer connection between PSE device 110 or DTE device 120 and the line-side (i.e., the LAN cable, such as a Cat5 or Cat3 cable), as well as digital signal processing (DSP) information obtained during the link-up process, may be employed to determine if a transformer at the transmitting or the receiving device is saturated. In some implementations, hardware register settings may be accessed, for example, to determine that the transformer is saturated; additionally, certain hardware registers may be set or software interrupts may be generated to indicate this condition. Based on this information (i.e., hardware register settings or software interrupts) or in accordance with another trigger mechanism, higher level software may alert a system user or network administrator that corrective action may be appropriate or required. Such corrective action may include ensuring that contacts are clean, changing the LAN cable, or reducing current levels.

PSE device 110 generally comprises PHY devices (i.e., PHY transmitters 111A and 111B and PHY receivers 112A and 112B), an echo canceller 113, and a power source 119. PHY transmitters 111A and 111B and PHY receivers 112A and 112B may be any PoE compliant PHY layer capable of full-duplex operation and suitable for use in connection with relevant standards including, but not limited to, IEEE 802.3ab, 802.3af, and 802.3at, as well as other standards developed and operative in accordance with known principles. The present disclosure is not intended to be limited to any particular PHY layer structure or architectural implementation.

PHY transmitters 111A and 111B may be generally operative to transmit data signals to DTE device 120 via cable 190. In that regard, PHY transmitter 111A may be coupled to a twisted pair of wires 191 and 192 associated with cable 190 via a transformer 114A; similarly, PHY transmitter 111B may be coupled to a twisted pair of wires 193 and 194 associated with cable 190 via a transformer 114B. As illustrated in FIG. 1, PHY receiver 112A may be operative to receive data signals from DTE device 120 over twisted pair of wires 191 and 192 associated with cable 190 via transformer 114A, and PHY receiver 112B may be operative to receive data signals from DTE device 120 over twisted pair of wires 193 and 194 associated with cable 190 via a transformer 114B.

Output of power source 119 may be electrically coupled to the line-side of transformers 114A and 114B as illustrated. In PoE applications, power source 119 may be operative to supply 48 volts of electric potential in accordance with the IEEE 802.3af standard, but other voltages may be desirable in some circumstances. Accordingly, it is contemplated that power source 119 may be implemented to produce electric potentials less than or greater than a nominal 48 volts, depending upon the overall operational characteristics or requirements of the system or communications protocol in connection with which PSE device 110 is intended to be used.

DTE device 120 generally comprises PHY transmitters 121A and 121B, PHY receivers 122A and 122B, and a load 128. As described above with reference to PSE device 110, PHY transmitters 121A and 121B and PHY receivers 122A and 122B associated with DTE device 120 may be implemented as or generally comprise any PHY layer compatible with (or otherwise suitable for use in connection with) a desired communications standard. As indicated in FIG. 1, PHY receiver 122A and PHY transmitter 121A may be coupled to twisted pair 191, 192 via a transformer 124A, and PHY transmitter 121B and PHY receiver 122B may be coupled to twisted pair 193, 194 via a transformer 124B.

Load 128 may be electrically coupled to the line-side of transformers 124A and 124B as illustrated. The depiction of load 128 in FIG. 1 is intended to represent any generic electrical load requiring power to operate DTE device 120 for its intended purpose. Load 128 may generally represent any electrical or electronic component such as an application specific integrated circuit (ASIC) or a microprocessor, for example. In that regard, in the FIG. 1 embodiment, DTE device 120 is illustrated as comprising a central processing unit 129, but the present disclosure is not intended to be limited to any particular electrical component or structural arrangement at DTE device 120.

For example, in some implementations, DTE device 120 may comprise a Voice over Internet Protocol (VoIP) telephone, a wireless (e.g., wireless LAN or Bluetooth) router or access point, a security camera or building access control system, a web camera, or some other electronic device requiring operating power. These various embodiments of DTE device 120 may have different components (such as microprocessors, memories, displays, or a combination of these and other components) requiring power, and these components and component combinations are generically illustrated in FIG. 1 as load 128. It will be appreciated that DTE device 120 may comprise additional components, such as DC/DC converters, transformers, or voltage regulators, for instance, as necessary or desired to control or otherwise to regulate the operating voltage supplied to load 128. These additional components may be selected, for example, depending upon the nature and operational characteristics of load 128 and the overall design parameters of DTE device 120.

As noted briefly above, network cable 190 may generally comprise twisted pair 191, 192 and twisted pair 193, 194 that are operative to carry data signals and operating power from PHY transmitter 111A associated with PSE device 110 to PHY receiver 122A associated with DTE device 120; similarly, additional twisted pair 193, 194 may be coupled between PHY transmitter 111B associated with DTE device 120 and PHY receiver 122B associated with PSE device 110.

It is noted that the FIG. 1 embodiment represents only one example of a typical PoE architecture. A conventional Cat5 network cable generally comprises four twisted pairs, only two of which are employed for 10BASE-T and 100BASE-TX Ethernet communications. Thus, in an alternative embodiment, two spare pairs of wires may be used to supply power in PoE applications; this is in contrast to the FIG. 1 embodiment in which the signal pairs (191,192 and 193,194, respectively) are used to deliver power. While the general operation set forth below is applicable to PoE architectures using the signal wires for power transmission, those of skill in the art will readily appreciate that the present disclosure is not intended to be limited to the architecture illustrated in FIG. 1.

In operation, voltage supplied from power source 119 to transformer 114A induces currents $i_1$ and $i_2$ in wires 191 and 192, respectively. Ideally, currents $i_1$ and $i_2$ are matched or balanced, i.e., of equal magnitude, however, this condition is not always satisfied. For example, respective resistances $R_1$ and $R_2$ in wires 191 and 192, respectively, may differ for various reasons, causing a mismatch or unbalanced current condition in which $i_1$ is not equal to $i_2$. Similarly, the various PHY layers at PSE device 110 and DTE device 120 are coupled to cable 190 via an RJ-45 connector, for example, in Ethernet implementations; an imperfect connection caused by pin misalignment or soiled contacts may create a small resistance, resulting in mismatched currents.

In an unbalanced current condition, the line-side coil on transformer 114A carries a residual current equal to $i_1-i_2$ (as illustrated in FIG. 1), which tends to induce a magnetic field between the coils of transformer 114A. In some situations, particularly where large currents (e.g., such as prescribed by the IEEE 802.3at standard) are supported, transformer 114A may become saturated, significantly degrading the quality of the data signal transmitted on the signal pair 191, 192, increasing bit error rates and instances of packet loss; additionally, link stability may be jeopardized, possibly resulting in link loss in some circumstances.

For instance, where a desired magnitude for currents $i_1$ and $i_2$ is about 350 mA or greater, even a small percentage difference in $R_1$ and $R_2$ may result in a difference between $i_1$ and $i_2$ on the order of about 100 mA. The resulting residual current may significantly reduce the inductance of the magnetic coil on the line-side of transformer 114A. As a consequence, the reduced inductance produces a high-pass filter effect on the data signal to be transmitted via twisted pair 191, 192 through transformer 114A. A significant portion (generally at lower frequencies) of the signal sought to be transmitted by PSE device 110 is reflected back as echo, creating poor signal to noise characteristics, particularly in full-duplex communications mode.

Echo canceller 113 may be employed to reduce some of the effects of an induced magnetic field at transformer 114A. In particular, echo canceller 113 may generally be operative to identify and remove (from a received data signal) data signals that were transmitted from PHY transmitter 111A (echoes) such that what is received at PHY receiver 112A is only that signal transmitted by DTE device 120. Echo canceller 113 may employ adaptive echo cancelling techniques, for instance, based upon knowledge of the data signal transmitted by PHY transmitter 111A. When magnetic saturation reflects transmitted energy due to reduced inductance at transformer 114A, echo canceller 113 may remove such reflected energy using any of various echo cancelling strategies. It will be appreciated that echo canceller 113 may also be implemented in a similar manner to remove energy transmitted by PHY transmitter 111B that is reflected when transformer 114B is saturated or otherwise suffers from reduced inductance. In some implementations, it may be desirable to provide each respective transceiver pair (i.e., 111A and 112A, on the one hand, and 111B and 112B, on the other hand) a respective dedicated echo canceller 113. In such embodiments, PSE device 110 may include multiple echo cancelling hardware devices or functional blocks. Additionally, it will be appreciated that DTE device 120 may employ one or more echo cancellers (not shown in FIG. 1 for clarity) and tap monitors (described below) in a similar manner as that set forth with reference to PSE device 110.

For example, a static strategy of echo cancellation may simply subtract a portion of the transmitted data signal from a received data signal; the net result of such subtraction should be a "net" received signal, i.e., the signal transmitted from DTE device 120 with any contributions of the signal transmitted by PSE device 110 removed. In common practice, a more sophisticated hybrid strategy may be employed in accordance with which dedicated circuitry may cooperate with the digital signal processing (DSP) operations of echo canceller 113 to eliminate, from a received signal, any echo associated with a transmitted signal.

Figure 2A:
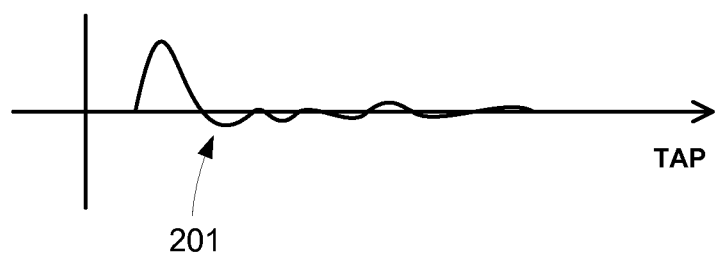
FIGS. 2A and 2B are simplified graphs plotting tap adaptations in an echo canceller.
Figure 2B:
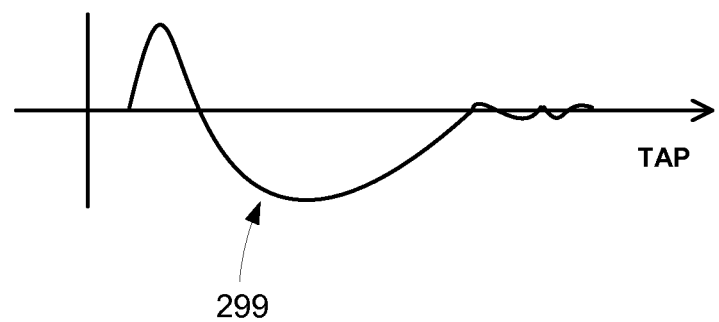

In that regard, FIGS. 2A and 2B are simplified graphs plotting tap adaptations in an echo canceller. The curves plot echo energy on a channel as a function of time. It will be appreciated that echo canceller 113 may generally employ a plurality of taps, or delays. A respective copy of the received signal, delayed by a predetermined time increment, may be processed at each respective one of the plurality of taps. Scaled or weighted signals at each tap may be subtracted from the received signal, removing echo energy.

The plot in FIG. 2A illustrates a situation in which $i_1=i_2$ in FIG. 1, and no (or only a minimal) induced magnetic field exists at the line-side magnetic coil in transformer 114A. The small area 201 of the curve represents echo energy that is effectively handled by echo canceller 113. In contrast, the plot in FIG. 2B illustrates an unbalanced current condition in which transformer 114A produces a high-pass filter effect with respect to twisted pair 191, 192. The large area 299 of the curve represents echo energy that taxes the capabilities of echo canceller 113. The signature large area 299 beneath the abscissa in FIG. 2B indicates that an induced magnetic field has saturated, or is threatening to saturate, transformer 114A.

In accordance with some embodiments, a system and method of determining PoE impairment may leverage this signature large area 299 by monitoring the adaptation of taps in echo canceller 113. For example, the area beneath the abscissa may be integrated; computations resulting in areas above a certain threshold may be interpreted as indicating a saturation condition, whereas computations resulting in areas below certain threshold (which may be different) may be interpreted as an indication of operation within normal parameters.

In that regard, a tap monitor 115 may be implemented in cooperation with echo canceller 113 to monitor the operation of echo canceller 113. In some instances, tap monitor 115 may monitor the tap adaptations as set forth above with reference to FIGS. 2A and 2B. Tap monitor 115 may be implemented as hardware (such as embodied in an ASIC, for instance) or as software instruction sets. In an embodiment in which tap monitor 115 is integrated with echo canceller 113, for example, it may be desirable that tap monitor 115 is a hardware implementation. Alternatively, tap monitor 115 may be incorporated into or used in conjunction with a multipurpose microprocessor or microcontroller. In use, tap monitor 115 may be apprised of the ongoing operation of echo canceller 113 and may examine the function of tap adaptations to identify areas representative of echo energy above a particular threshold. This threshold may be devised from empirical data, for instance, or may be predetermined based upon theoretical or expected values; additionally or alternatively, it may be desirable to implement the threshold as a selectively or dynamically adjustable threshold. In one such embodiment, a user or network administrator may be enabled to alter the threshold in accordance with desirable or experienced operational characteristics of the network. In another embodiment, tap monitor 115 may receive additional input from another component of PSE 110, for instance from a transceiver pair (111A/112A or 111B/112B), a microprocessor or other controller, or software 116 (described below); accordingly, tap monitor 115 may also be apprised of bit error rates, packet loss, or other relevant communications parameters such that the threshold may be adjusted in real time based upon current operating conditions. In operation of PSE 110, output from tap monitor 115, either in isolation or in conjunction with other processing steps, may be employed to trigger an alert as set forth below.

Upon determining that a particular energy threshold has been reached or exceeded, tap monitor 115 may trigger a warning event. In one embodiment, tap monitor 115 may set hardware registers at PSE device 110 (or cause such registers to be set); additionally or alternatively, tap monitor 115 may generate, or cause to be generated, one or more software interrupts. These register settings or interrupts (or some other equivalent trigger mechanism) may generally be indicative of a magnetic saturation condition at transformer 114A, and may be received or retrieved by higher-level software 116 for additional operations. Software 116 may alert a user or network administrator of the condition, for example, and may additionally recommend corrective action to rectify the unbalanced current at the source of the condition. As noted above, such corrective action may include ensuring that RJ-45 contacts are clean, changing the LAN cable, or reducing current levels. Also as noted above, the foregoing components and functionality may be implemented at DTE device 120 in a manner similar to that described with reference to PSE device 110.

Figure 3:
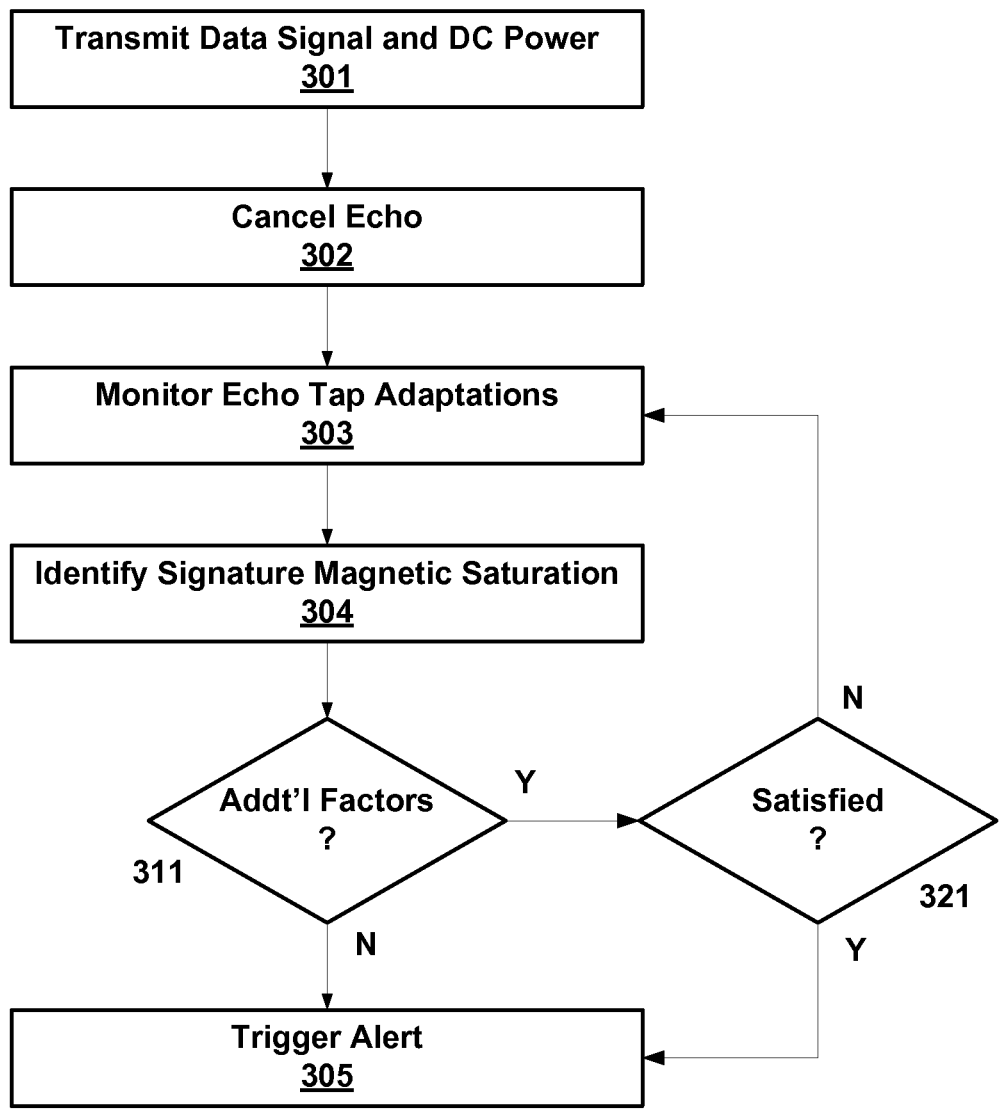
FIG. 3 is a simplified flow diagram illustrating general operation of one embodiment of a method of determining signal impairment due to an unbalanced current condition.

FIG. 3 is a simplified flow diagram illustrating general operation of one embodiment of a method of determining signal impairment due to an unbalanced current condition. The sequence of operations depicted in FIG. 3 may be performed by a PSE device 110 or a DTE device 120 as described above with reference to FIG. 1, for example, or by another suitably configured PoE compatible device.

As indicated at block 301, an embodiment of a method of determining signal impairment may begin with a PSE transmitting a data signal and DC power. This transmission generally involves coupling a PHY layer to a network cable using appropriate hardware connectors; in one embodiment described above, the transmitting comprises coupling a PSE to a Cat5 cable using an RJ-45 connector.

Echo cancellation may be performed as indicated at block 302. Typical PSE devices employ various types of echo cancellation to improve signal to noise ratios. In accordance with one aspect of the present invention, a method may monitor operation of an echo canceller associated with the PSE device (block 303) to identify a signature representative of magnetic saturation (block 304) at a transformer at the connection between the PHY layer and the line-side of the network cable. As described above with reference to FIGS. 1, 2A, and 2B, this monitoring may comprise monitoring the tap adaptations of the echo canceller in some embodiments. In operation, DSP algorithms at a tap monitor, the echo canceller, or both, may be employed to integrate echo energy over time to identify conditions that are characteristic of magnetic saturation. In the foregoing manner, the method may determine when echo energy reflected back to the PSE is above a predetermined or dynamically variable threshold.

Finally, the method may trigger an alert (block 305). This alert may be operative to inform a user or network administrator that an unbalanced current condition may be causing magnetic saturation that may adversely affect communications signaling. As set forth above, hardware register settings or software interrupts may be employed to enable software or other instruction sets to generate the alert; as an alternative, an alert may be solely hardware-based, in which case one or more bits in a hardware register may be set as an indication of a fault condition, and the alert may be triggered by this alone. Responsive to the alert being triggered, an output may be provided. For example, the alert may include an audible alarm, for example, or a visual display. In some instances, a recommendation may be supplied along with the alert; for example, the method may recommend, among other things, that contacts be cleaned, that the network cable be replaced, or that current be reduced.

In one embodiment, the trigger operation at block 305 may be responsive to the identification and determination operation at block 304. In the FIG. 3 embodiment, however, optional additional factors may be considered as indicated at decision block 311. A determination may be made at block 311 whether additional factors may affect the trigger operation. If no additional factors are involved, flow goes directly to block 305 and the alert is generated. If additional factors are involved, flow goes to decision block 321, where a determination may be made regarding whether certain criteria are satisfied. For example, minimum or maximum bit error rates or packet loss parameters may be examined, and a decision to generate an alert at block 305 may be influenced not only by reflected energy, but also from these or other real time conditions of network communications. As one example, if a maximum bit error rate threshold has been set, and a determination is made that the threshold has been exceeded, then that criterion has been satisfied; flow would proceed from decision block 321 to trigger operation at block 305. If, however, the bit error rate threshold has not been exceeded, then flow may loop back to block 303. Any of various additional factors or communications parameters may be considered at blocks 311 and 321, and these may be application-specific or otherwise influenced by the system in which the PSE is deployed.

It is noted that the arrangement of the blocks in FIG. 3 does not necessarily imply a particular order or sequence of events, nor is it intended to exclude other possibilities. For example, the operations depicted at 303 and 304 or at 304 and 305 may occur substantially simultaneously with each other; similarly, the determinations made at decision blocks 311 and 321 may be incorporated in a single operation, or may be eliminated in some instances.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of determining an impairment in a Power over Ethernet application, said method comprising:
monitoring operation of an echo canceller with a tap monitor, the echo canceller being associated with a physical device, the echo canceller configured to remove echo energy from a signal;
measuring the echo energy over time;
determining that the measured echo energy over time is above a threshold indicating a saturation condition; and
responsive to said determining that the measured echo energy over time is above the threshold, triggering an alert indicating that the saturation condition is caused by an unbalanced current.

2. The method of claim 1, wherein said monitoring comprises monitoring tap adaptations of the echo canceller to identify areas representative of the measured echo energy being above the threshold.

3. The method of claim 1, wherein said triggering comprises setting one or more bits in a hardware register.

4. The method of claim 1, wherein said triggering comprises generating a software interrupt.

5. The method of claim 1, wherein the alert comprises an audible alarm or a visual display.

6. The method of claim 1, wherein the threshold is predetermined based on theoretical or expected values of the echo energy.

7. The method of claim 1, wherein the threshold comprises a selectively or dynamically adjustable threshold.

8. The method of claim 1, further comprising adjusting the threshold in real time based on a communications parameter associated with the physical device.

9. The method of claim 8, wherein the communications parameter comprises a bit error rate.

10. The method of claim 1, wherein the alert includes a recommendation to clean contacts, replace a network cable, or reduce current levels.

11. A device for use in a Power over Ethernet application, the device comprising:

an echo canceller to remove echo energy from a signal received at a receiver; and a tap monitor configured to:

monitor operation of said echo canceller;

compute a value of the echo energy over time; and responsive to a determination that the computed value of the echo energy over time is above a threshold, which indicates a saturation condition, trigger an alert to indicate unbalanced current as a cause of the saturation condition.

12. The device of claim 11, wherein said tap monitor is configured to monitor tap adaptations of said echo canceller to identify areas representative of the computed value of the echo energy over time being above the threshold.

13. The device of claim 11, wherein the output from said tap monitor is employed to set one or more bits in a hardware register at the device.

14. The device of claim 11, wherein the output from said tap monitor is employed to generate a software interrupt at the device.

15. The device of claim 11, wherein the alert comprises an audible alarm or a visual display.

16. The device of claim 11, wherein the threshold is predetermined based on theoretical or expected values of the echo energy.

17. The device of claim 11, wherein the threshold comprises a selectively or dynamically adjustable threshold.

18. The device of claim 11, wherein the threshold varies, in real time, in accordance with a communications parameter.

19. The device of claim 18, wherein the communications parameter comprises a bit error rate.

20. The device of claim 11, wherein the alert comprises a recommendation to clean contacts, replace a network cable, or reduce current levels.

* * * * *